Patented Feb. 16, 1943

2,311,290

UNITED STATES PATENT OFFICE 2,311,290

METHOD OF INCREASING THE PLASTICITY OF PORTLAND CEMENT MIXTURES

Robert Ben Booth, Springdale, Conn., assignor to American Cyanamid Company, New York, N. Y., a corporation of Maine No Drawing. Application May 23, 1940, Serial No. 336,717

6 Claims. (Cl. 106—92)

This invention relates to a method of increasing the plasticity of Portland cement mixtures. One of the serious problems in the concrete industry lies in the lack of plasticity of ordinary Portland cement mixtures used in concrete. This lack of plasticity makes it necessary either to use larger amounts of water than would otherwise be necessary or makes for an insufficient flow. In either event the concrete is not as dense and is not as satisfactory. A number of types of compounds have been used in order to increase the plasticity of cement. Many of these compounds, however, while increasing the plasticity of the cement mixtures have an adverse effect on the strength of the cement. In general, plasticity is measured by a percentage of slump of a test cone. Practically all compounds which have been used in the past to increase plasticity have had an adverse effect on the strength. However, unless the adverse effect is material, this is not of great importance and as a practical matter unless the strength of the cement either on 7 or 28 day strength tests is changed more than 10%, the effect is not to be considered of any serious practical significance because the factors entering into the strength of a given strength test sample of concrete, even when using cement from the same lot, are sufficiently complicated so that exact checks on strength are not possible. For practical purposes, therefore, any strength within 10% can be considered as within the experimental error or normal variation.

The present invention is based on the use of certain crude carbohydrates such as black strap molasses, sisal hemp residues, and the like. It should be understood that these carbohydrate residues contain predominantly carbohydrates and are not to be confused with residues from the fermentation of carbohydrates which contain practically no yeast fermentable sugars, and which form the subject matter of my copending application Serial No. 332,963, filed May 2, 1940.

The amounts of the crude carbohydrate residues which are required are very small, and as these materials are very cheap a considerable plasticizing effect can be obtained at very small cost. While the present invention is not limited to any critical quantities, in general I prefer to use from 0.01 to 0.1%. Much larger amounts result in somewhat greater loss in strength and amounts below 0.01% do not give sufficient plasticizing effect to be worthwhile.

The crude carbohydrate residues may be added to the cement prior to or during mixing or may be incorporated during grinding of the cement clinker. As they are used in very low concentrations, care should be taken to insure uniform distribution. For this reason where the materials are to be used as an addition to the cement during mixing it is advantageous in some cases to dilute the carbohydrate residues with inert diluents such as kieselguhr, fine sand, and the like which make it easier to obtain uniform distribution of such small quantities of the material in cement work where small mixing batches are employed. In very large concrete operations the batches are of such size that uniform mixing presents no problem.

The invention will be described in greater detail in conjunction with the following specific examples in which the Portland cement mix is made up as follows:

*Example 1*

| | Parts |
|---|---|
| Portland cement | 2041 |
| Sand (—8 mesh) | 6123 |
| Water | 1210 |

This mixture is divided up in a number of portions, one of which is used as a control. To one batch there was added 0.075% of black strap molasses. The concrete showed a 53% increase in slump over the control and the changes in strength at the end of 7 days and 28 days were —1.6 and +9.3% respectively.

*Example 2*

A further portion of the mix described in Example 1 was uniformly mixed with 0.05% of sisal hemp residues. The increase in slump was about 63% over the control, and changes in strength after 7 days and 28 days were —8.7 and —2.1% respectively.

What I claim is:

1. A Portland cement composition comprising Portland cement having admixed therewith from 0.01% to 0.1% of crude carbohydrate residues.

2. A Portland cement composition comprising Portland cement having admixed therewith from 0.01% to 0.1% of black strap molasses.

3. A Portland cement composition comprising Portland cement having admixed therewith from 0.01% to 0.1% of sisal hemp residues.

4. A method of increasing the plasticity of a member of the group consisting of Portland cement, a mixture of Portland cement and water, and a mixture of Portland cement, water and sand which comprises adding thereto from 0.01% to 0.1% of crude carbohydrate residues, said percentage being based on the amount of dry Portland cement present.

5. A method of increasing the plasticity of a member of the group consisting of Portland cement, a mixture of Portland cement and water, and a mixture of Portland cement, water and sand which comprises adding thereto from 0.01% to 0.1% of black strap molasses, said percentage being based on the amount of dry Portland cement present.

6. A method of increasing the plasticity of a member of the group consisting of Portland cement, a mixture of Portland cement and water, and a mixture of Portland cement, water and sand which comprises adding thereto from 0.01% to 0.1% of sisal hemp residues, said percentage being based on the amount of dry Portland cement present.

ROBERT BEN BOOTH.